Oct. 29, 1968　　　　G. E. FRIG　　　　3,407,749

MOTOR FOR PROPULSION AND LOAD SUPPORT

Filed Aug. 31, 1966

INVENTOR.
Gerald E. Frig
BY
Thomas N. Young
ATTORNEY

United States Patent Office 3,407,749
Patented Oct. 29, 1968

3,407,749
MOTOR FOR PROPULSION AND LOAD SUPPORT
Gerald E. Frig, Warren, Mich., assignor to General Motors Corporation, Detroit, Mich., a corporation of Delaware
Filed Aug. 31, 1966, Ser. No. 576,325
6 Claims. (Cl. 104—148)

ABSTRACT OF THE DISCLOSURE

A magnetic support and propulsion system for vehicles including roadway apparatus to produce magnetic fields having forward sloping intensity profiles and a reaction member on the vehicle which may be variably angled with respect to the fields to vary the support and propulsion force components. The fields may be caused to displace with the vehicle by means of switching circuits.

---

This invention relates to magnetic support and propulsion systems for vehicular bodies.

It is well known that magnetic forces may be employed to support a body free from physical contact with a surrounding environment. Magnetic suspension systems have been suggested to obtain frictionless support of a vehicle or other displaceable body in order to minimize the power required to produce the desired displacement. However, where so applied, such magnetic suspension systems typically require auxiliary and independent sources of power to produce displacement; for example, a reaction jet may be employed to displace a magnetically supported vehicle.

In accordance with the present invention, both support and propulsion for a vehicular body may be provided by an integral magnetic system. In general, the invention is realized in a combination including a roadway having preestablished boundaries and a vehicular body adapted to travel thereover. The vehicular body is provided with at least one magnetic reaction surface spaced from the roadway to produce support and propulsion forces on the body. The roadway is provided with means for producing at least one magnetic field area having a forward sloping intensity profile measured along the path of travel. The reaction surface may be angled with respect to the roadway thereby to produce a magnetic repelling force having both a vertical support component and a horizontal propulsion component. By causing the magnetic field area to be displaced along the roadway, the vehicular body is also caused to be displaced therealong.

In a preferred embodiment of the invention means are provided for controlling the magnitude of the propulsion force by varying the angle of the vehicle mounted support means with respect to the roadway.

In this specification, the term "magnetic" shall be taken to apply to fields generated by both permanent magnet and electromagnetic means.

Figure 1:
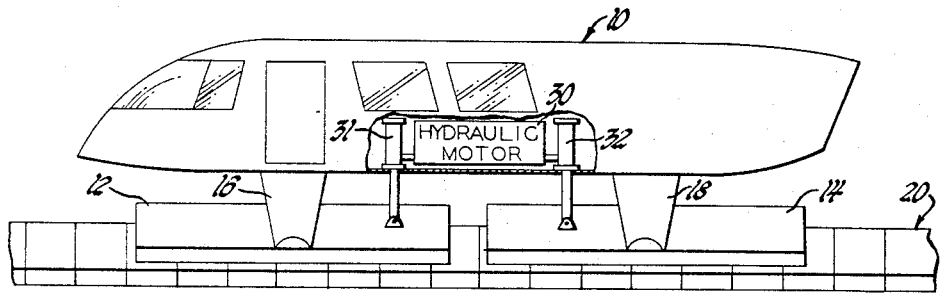
Figure 2:
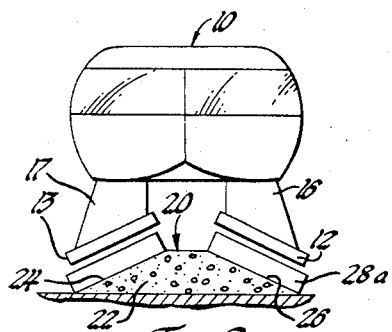
Figure 3:
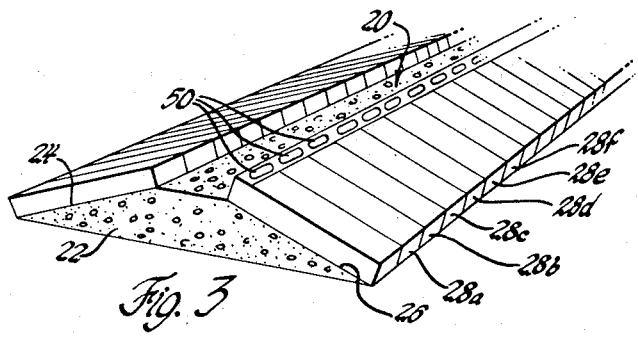
Figure 4:
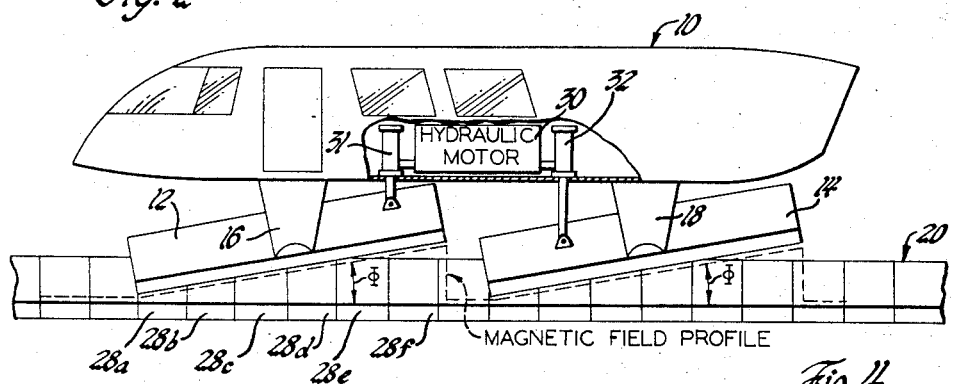
Figure 5:
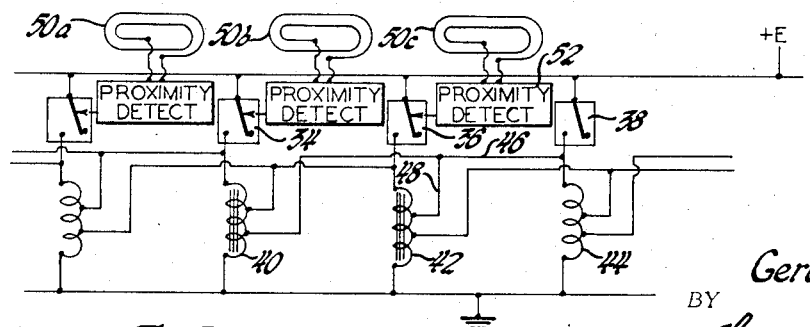

A detailed description and explanation of a specific embodiment of the invention follows and is to be taken with the accompanying figures of which:

FIGURE 1 is a side view of a vehicle having a support and propulsion system which embodies the inventions;
FIGURE 2 is a front view of the vehicle and roadway;
FIGURE 3 is a three-quarter view of a roadway for the vehicle;
FIGURE 4 is a side view of the vehicle and roadway illustrating the nature of the magnetic field area; and
FIGURE 5 is a schematic wiring diagram of the electrical control means associated with the roadway.

Referring to FIGURES 1 and 2, the illustrative embodiment of the invention is applied to the support and propulsion of a vehicle 10 having a generally aerodynamic design and adapted for the conveyance of personnel and/or cargo. The vehicle 10 rests upon planar reaction elements 12, 13, 14 and a fourth element which is not shown. In the drawing, the reaction elements are disposed generally beneath the vehicle in longitudinally spaced pairs, the elements of each pair being laterally spaced apart and independently connected to the vehicle 10 by means of struts 16, 17 and 18 which depend from the underside of the vehicle 10.

Each of the reaction elements 12, 13, 14 is similar to the others and is constructed of magnetic material which is permanently magnetized such that one magnetic pole occurs on the entire upper surface as shown in the drawing, while the other pole occurs over the entire lower surface. The lower surface of each reaction element thus constitutes a reaction surface which coacts with a segmented magnetic roadway 20 so as to levitate the vehicle 10 out of physical contact with the surface of the roadway 20 as best shown in FIGURE 2. The "permanent" magnetization of elements 12–14 may, of course, be accomplished by electromagnetic means as well as by permanent magnets.

FIGURE 3 shows roadway 20 to comprise a concrete bed 22 having a horizontal center section and oppositely sloping side portions 24 and 26. Each of the side portions has disposed thereon a plurality of contiguous and laterally extending electromagnetic elements such as 28a, 28b and 28c. Each of the electromagnetic elements represents an independent source of magnetic flux capable of producing a field which extends above the roadway by at least the normal spacing between the upper surface of the roadway 20 and the reaction surface of the elements 12, 13 and 14. Each of the elements 28a, 28b and 28c is independently actuable to produce a field of a selected intensity or magnitude. In addition, each of the elements may contain sufficient magnetic material to be permanently magnetized thereby to produce a permanent residual field irrespective of the actuation of the particular element. The polarity of this residual field is chosen to be opposite to the field produced by the magnetic elements 12, 13 and 14. The result is a force of repulsion between roadway 20 and the reaction elements 12, 13 and 14, which tends to levitate or suspend the vehicle 10 above the surface of roadway 20 free from physical contact therewith.

As shown in FIGURES 2 and 3, lateral stability of the vehicle 10 is provided by sloping the side portions 24 and 26 of the roadway 20 away from one another and by similarly angling the reaction elements 12, 13 and 14 so as to be substantially parallel with the surface of the roadway portions 24 and 26. It will be understood that such lateral stability may be provided in other ways, including reversing the slope of the roadway portions 24 and 26 from that shown. Moreover, while the surfaces of the roadway as well as the reaction surfaces of elements 12, 13 and 14 are shown to be planar in nature, they may, of course, be curved laterally so as to provide the desired lateral stability. Again, a curvature in either sense, that is, either concave or convex when viewed in cross section, will provide the desired stability.

As indicated, the embodiment of the invention described herein not only supports or levitates the vehicle 10 but provides variable propulsion forces as well. These propulsion forces are provided by the aforementioned independent actuation of the electromagnetic elements 28a, 28b and 28c, as will be described with reference to FIGURES 4 and 5.

Looking to FIGURE 4, the vehicle 10 is shown in a configuration which provides propulsion forces tending to propel the vehicle toward the left as seen in the figure. This is accomplished by selective actuation of consecutive sets of electromagnetic elements 28 so as to produce four magnetic field areas having forwardly sloping intensity profiles as shown in FIGURE 4. In the figure, only two such field areas are shown; however, it is to be understood that in the configuration employing four reaction elements, one such field area is provided for each element. Each field area may be generated by the graduated actuation and energization of sets of sequential electromagnetic elements 28. For example, the six consecutive elements 28a, b, c, d, e, and f may be energized such that 28c produces only the minimum field intensity, 28f produces the maximum intensity and the intermediate elements produce intermediate values. The result of such graduated actuation is a forwardly sloping intensity profile; that is, the intensity decreases toward the front or foremost part of the vehicle 10 in the direction of travel. The sloping intensity profile may be generated by graduated energization of two or more consecutive electromagnetic elements.

To take advantage of the forwardly sloping intensity profile to produce propulsion forces, the reaction elements 12, 13 and 14 are adapted to be rotated about transverse axes. This may be accomplished by means of a hydraulic motor 30 which operates two extensor cylinders 31 and 32 and respective rods which are connected from the bottom of the vehicle 10 to respective portions of the reaction elements 12 and 14. Proper actuation of the cylinders 31 and 32 results in parallel rotation of the elements 12 and 14 to positions which parallel the intensity profile of the field areas directly beneath the respective reaction surfaces. As is apparent, the force bearing upon the rearmost portion of each of the reaction elements is greater than that bearing upon the foremost portion. Therefore, a couple is produced which tends to thrust the vehicle 10 forwardly in the direction of decreasing field intensity.

It is apparent that in order to accelerate and propel the vehicle 10, the forwardly sloping field areas must be caused to translate along the roadway 20 in the direction of desired movement and at the desired speed of the vehicle. This effect may be accomplished by means of a circuit, a portion of which is schematically indicated in FIGURE 5. The circuit includes a plurality of switches 34, 36 and 38, for example, equal in number to the number of segments 28 in the roadway 20. Each switch is connected on one side to a source of voltage indicated as +E. Switches 34, 36 and 38, which represent the continuum of circuitry involved in this embodiment, are connected in series with electromagnetic coils 40, 42 and 44, respectively. The coils are connected to a common ground. In addition to being connected completely in series with each of the immediately associated coils, each of the switches is also connected in series circuit with decreasing portions of each of a given number of forwardly disposed coils. For example, switch 38 is connected in circuit with the entire coil 44. It is also connected by means of conductors 46 and 48 in circuit with approximately 50% of coil 42 and solely by means of conductor 46 in circuit with approximately 25% of coil 40. Similarly, switch 36 is connected in circuit with all of coil 42 approximately 50% of coil 40 and approximately 25% of the next coil in sequence which is not numbered. In this fashion, closure of any one switch is effective to produce a magnetic field area of forwardly sloping intensity profile, as shown in FIGURE 4. It will be understood that each of the coils 34, 36 and 38 is associated with an individual electromagnetic element 28.

To cause the forwardly sloping field intensity areas to translate along the roadway 20 in synchronism with the vehicle 10, a series of proximity detecting windings 50 are distributed along roadway 20 as indicated in FIGURE 3. FIGURE 5 shows three such windings 50a, 50b and 50c. As the forward portion of the foremost reaction element in the direction of travel (for example, element 12) comes into proximity with, for example, winding 50c, the inductance of that winding is altered. This change in inductance may be sensed by a proximity detector 52 the output of which moves the armature of the associated switch 36 into a closed position. This energizes the forward coils in the graduated fashion described producing the sloping field indicated in FIGURE 4. It will be understood that the physical location of windings 50 will be such that the field produced will be beneath the reaction element triggering the field. After the vehicle has passed entirely over the portion of roadway 20 desired to be affected, the inductance of the particular winding will again be changed causing the switch to open, thereby conserving power when no vehicle is present.

It will be understood that the rate at which vehicle 10 travels may be controlled entirely from within the vehicle by controlling the angle which the planar reaction elements 12 make with the roadway plane as shown in FIGURE 4. Similarly, it is possible to produce a braking effect by reversing the angularity of the reaction elements from that shown in FIGURE 4 to the reverse direction.

It will be appreciated that the invention has been described with reference to an illustrative embodiment, which is not to be construed in a limiting sense.

What is claimed is:

1. A magnetic propulsion and support system for a vehicular body adapted to travel an established roadway including: a vehicular body, means defining a roadway, field-producing means associated with the roadway including a contiguous array of field producing elements distributed along said roadway and electrically connected into groups of at least two adjacent elements, energization means for supplying upon actuation thereof, graduated quantities of electrical energy to elements in said groups thereby to produce at least one magnetic field area having a forward sloping intensity profile taken along said roadway and extending above the surface thereof, at least one body-mounted reaction element disposed adjacent but spaced from the surface of said roadway to be in said field area, said element being magnetized to produce a repelling force tending to support the body from the roadway, said element adapted to be forwardly angled with respect to the roadway about an axis substantially transversely of the roadway thereby to produce a forwardly directed component of said repelling force tending to propel said body along said roadway and means for displacing said magnetic field area along said roadway to continuously propel and support said body.

2. Apparatus as defined in claim 1 including means controlled by said vehicular body for sequentially actuating said energization means to displace said field area along said roadway at a rate corresponding to the rate of displacement of the vehicular body.

3. Apparatus as defined in claim 2 further including means for varying the angle of said support means with respect to the roadway thereby to accelerate said vehicular body.

4. Apparatus as defined in claim 1 wherein both said roadway and said support means include lateral portions of reversely similar slope thereby to provide lateral stability for said body with respect to said roadway.

5. Apparatus as defined in claim 1 wherein said field producing elements are electromagnets distributed along said roadway in closely spaced relation.

6. Apparatus as defined in claim 5 wherein the electromagnets produce a residual field of uniform intensity sufficient to maintain the body and reaction elements in spaced relation with the roadway.

References Cited

UNITED STATES PATENTS

| | | |
|---|---|---|
| 357,516 | 2/1887 | Atwater. |
| 2,856,573 | 10/1958 | Williams et al. _____ 318—243 |
| 3,090,327 | 5/1963 | Crowley. |
| 3,158,765 | 11/1964 | Polgreen. |
| 3,198,139 | 8/1965 | Dark _____ 104—148 |

ARTHUR L. LA POINT, *Primary Examiner.*

STANLEY T. KRAWCZEWICZ, *Assistant Examiner.*